United States Patent
Pike, Sr.

(10) Patent No.: US 8,967,506 B2
(45) Date of Patent: Mar. 3, 2015

(54) TREATMENT OF FLY ASH CONTAMINATED WITH ACTIVATED CARBON

(71) Applicant: VHSC, Ltd., Tortola (VG)

(72) Inventor: Clinton Wesley Pike, Sr., Montgomery, TX (US)

(73) Assignee: VHSC Ltd., Tortola (VG)

( * ) Notice: Subject to any disclaimer, the term of this patent is extended or adjusted under 35 U.S.C. 154(b) by 23 days.

(21) Appl. No.: 13/815,448

(22) Filed: Mar. 4, 2013

(65) Prior Publication Data
US 2014/0245931 A1   Sep. 4, 2014

(51) Int. Cl.
| B02C 19/00 | (2006.01) |
| C04B 7/26  | (2006.01) |
| C04B 28/04 | (2006.01) |
| C04B 18/08 | (2006.01) |
| C04B 111/10 | (2006.01) |
| C04B 111/20 | (2006.01) |

(52) U.S. Cl.
CPC . *C04B 7/26* (2013.01); *C04B 28/04* (2013.01); *C04B 18/08* (2013.01); *C04B 2111/1087* (2013.01); *C04B 2111/29* (2013.01); *F23J 2700/00* (2013.01); *Y10S 241/14* (2013.01)
USPC ................... 241/30; 241/DIG. 14

(58) Field of Classification Search
USPC ............ 241/30, DIG. 14, 172, 299, 176
See application file for complete search history.

(56) References Cited

U.S. PATENT DOCUMENTS

| 5,714,002 A | 2/1998 | Styron |
| 6,890,507 B2 * | 5/2005 | Chen et al. ............ 423/460 |
| 2003/0066461 A1 | 4/2003 | Chen et al. |
| 2009/0121052 A1 | 5/2009 | Ronin et al. |
| 2012/0280069 A1 | 11/2012 | Pike |

FOREIGN PATENT DOCUMENTS

DE   102005045803 A1   4/2007

* cited by examiner

*Primary Examiner* — Mark Rosenbaum

(57) ABSTRACT

Fly ash contaminated with activated carbon is treated to neutralize the activated carbon by placing the contaminated fly ash in a rotary mill and introducing ozone. The result is that entrained air in concrete made from activated fly ash will contain greater than 4 percent entrained air.

7 Claims, 5 Drawing Sheets

TREATMENT OF FLY ASH CONTAMINATED WITH ACTIVATED CARBON

FIELD OF THE INVENTION

This invention relates to the treatment of activated fly ash contaminated with activated carbon and more particularly to the utilization of neutralized carbon-contaminated fly ash in the manufacture of concrete.

BACKGROUND OF THE INVENTION

As described in U.S. patent application Ser. No. 13/647,838 entitled Process for Treating Fly Ash and a Rotary Mill Therefore by W. Clinton Pike filed Oct. 9, 2012 and incorporated herein by reference, activated fly ash has been utilized to replace as much as 50-80% by weight of Portland cement in the manufacture of concrete. In order to be able to activate the fly ash, a specialized rotary mill is utilized which intergrinds the fly ash with a calcium additive to expand the fly ash surface area to activate it so that it can be used to replace Portland cement in the manufacture of concrete.

The process described above has been exceptionally successful in the manufacture of high strength concrete, and as a result fly ash or pozzolan has provided an extremely inexpensive substitute for Portland cement in such applications.

As is well known, in order for concrete to be usable in areas of the country where the temperature oscillates from freezing to thawing, it is important that the entrained air in the mixture be in excess of 4%. The entrainment of the air protects the concrete against cracking when the temperature goes below freezing as well as when there is a freeze/thaw cycle.

However, it has been found that when activated carbon is injected to remove mercury from the flue gas of power plants, the resulting pozzolan or fly ash is contaminated with a certain amount of this injected activated carbon (ACI). When one attempts to activate the fly ash contaminated with activated carbon in the process described what happens is that air entrainment drops close to zero due to the reaction of the air entrainment admixture and the ACI.

When using the above-described fly ash activation process or any other process the result is that the activated carbon contaminated fly ash cannot be used to make concrete for use in freeze/thaw zones without massive use of surfactants that can result in overdosing or mix changing that ruins the concrete.

This problem of activated carbon is exacerbated by the increased demand in the use of ACI to treat the flue gas at coal fired power stations due to environmental concerns that mandate removal of mercury from the flue gas which exists from power plant stacks into the atmosphere. This increased useage is a result of increased compliance with environmental standards now in place to reduce mercury contamination in power plant emissions. It is thus important to be able to neutralize the effects of pozzolan or fly ash contaminated with activated carbon to allow its continued beneficial reuse.

More particularly, ACI is injected into the flue gas stream from coal fired boilers in which the carbon reacts with the mercury and captures the mercury from the flue gas. This type of treatment of flue gases has been shown to be effective in capturing all forms of mercury. However, once the mercury has been captured by the activated carbon, the activated carbon flows to the electrostatic precipitator (or bag house) where it is comingled with the fly ash such that the activated carbon is also captured by the electrostatic precipitator or other fine particulate collection system. In any case, the activated carbon ends up in the fly ash and as a result becomes a part of the fly ash.

It is noted that activated carbon or ACI is a very reactive material. It is generally ten times more reactive than carbon produced from the incomplete combustion of coal and thus is a powerful oxidizing material.

Further, as noted above, when activated fly ash is mixed with ordinary Portland cement as a partial replacement, it brings along many beneficial properties when making concrete. A few of these beneficial properties are lower permeable concrete meaning that the concrete is more durable, as a pozzolan it contributes to higher long term strengths than Portland cement alone, and better flow of the wet concrete with lower water to cement ratios and lower slump of flow of the mixed concrete, meaning higher slumps with the same water content.

All of these properties are beneficial to the final concrete and make it a better engineered material with better chemical resistant abilities due to the reduction of the calcium hydroxide that is given off as a waste reaction from the Portland cement by nature of the fly ash pozzolan reacting with the CaOH to form a pozzolanic cement. and the activated pozzolan or fly ash siliceous parts react to form a pozzolanic cement.

However, using activated carbon contaminated fly ash, destroys the ability to entrain air using air entrainment chemicals at normal or elevated levels of doseage.

By way of further background, about 100 million tons of ordinary Portland cement are used in the United States annually and about 25 million tons of fly ash are used in cementitious materials such as concrete. Concrete is the largest building products material used by man today. It is used in almost every structure that is built and is consistently being adjusted to improve its quality.

One aspect that has been corrected over time are the freeze/thaw issues related to concrete.

It was determined that one could entrain air in concrete and thus eliminate the issue of the concrete bursting apart when it is subjected to freezing temperatures and then allowed to thaw. Many concrete highways first paved solely with original Portland cement broke apart completely in areas where freeze/thaw can be a daily or weekly event.

With the advent of air entraining agents (AEA), these surfactants allowed the controlled addition of micro bubbles to be formed in the concrete mix, thus allowing expansion and contraction of the concrete to occur. The result is avoiding the complete breakdown of the concrete. Thus, all modern concrete is treated with air entrainment chemicals to form the protective air bubbles.

It has now been found that the amount of entrained air should be in excess of 4%, but less than 6%.

This being the case, it has recently become apparent that fly ash contaminated with activated carbon causes the air entrainment to be less than desirable due to the highly reactive nature of the activated carbon. The activated carbon, it has been found, can completely soak up the air entraining agents used to produce a safe amount of air in the manufacture of concrete.

To counter the reactivity of the activated carbon, in some cases there have been attempts to increase the dosage of the air entraining agents to offset the activated carbon. The increased dosage of the air entraining agents to provide 4% entrained air now requires 8-10 ounces per cwt such that it becomes almost impossible not to overdose the concrete which results in entrained air in excess of 6% by weight. Note that the overdosing causes strength issues. Moreover, having excessive air results in permeability issues and a host of other problems.

In an effort to remove activated carbon from the fly ash, it has been proposed to eliminate the carbon by combusting it. This can remove the carbon completely and thus yield a pozzolan fly ash that does not have any issues with respect to entrained air. This methodology is very expensive and requires a large area to process and combust the carbon and gives resulting issues in the fly because of the sintering caused when the fly ash is brought up in temperature to combust the carbon.

Other companies such as Separation Technologies and JTM industries use electrostatic separation to eliminate the carbon due to its positive charge. Using positive charge removes most of the activated carbon by forcing the carbon out of the fly ash. This process can remove most but not all of the carbon and it is very sensitive to atmospheric moisture conditions. Thus, there are limits on the production capability associated with electrostatic separation.

As mentioned above, still others have used surfactants or iodine-derived chemicals to attach to the carbon surface and thus lower its ability to impact air entrainment. In one method, these surfactants are applied to the fly ash itself at transfer points utilizing atomized mists. Given the nature of fly ash when the treatment is applied, usually at the power station, the result is that the fly ash is treated and then stored in a tanker to move it to another storage bin. The result is that the fly ash is handled several times. Note, each time the fly ash is handled, usually pneumatically, it is impacted during transfer and the activated carbon that has been surface treated is easily broken down. With the breakdown one has new exposed activated carbon surfaces that again impact air entrainment. Moreover, dosing with a surfactant cannot be exact, as real time carbon injection or formation of unburned carbon cannot be precisely predicted.

The unfortunate result is overdosing that causes huge swings in the entrained air in the concrete, as the non-reacted surfactant, due to overdosing, will cause entirely too much air to form. It is the concrete producer's nightmare that from truckload to truckload the air percentage swings dramatically in and out of specification such that much of the concrete must be rejected.

There is therefore a need for a better method of either removing activated carbon from fly ash or pozzolan or neutralizing it so that the percentage of entrained air can be accurately controlled.

SUMMARY OF INVENTION

In order to neutralize the activated carbon that contaminates the fly ash in the subject invention the contaminated fly ash is pre-treated in the same type of rotary mill used to activate the fly ash. This pretreatment step involves milling the raw contaminated fly ash in the presence of ozone.

During the grinding process the activated carbon particles are neutralized by the ozone while the surface area of the ACI is subjected to intense surface treating over an extended period of time versus typical grinding systems. When the resultant fly ash is used as the starting material for the fly ash activation associated with the process described above, the result is concrete with greater than 4% entrained air using typical air entrainment chemicals produced by most all concrete chemical admixtures companies at doseage levels typically used for fly ash mixes that have no ACI contamination.

Note, the type of mill used for this ozone treatment is a specialized rotary mill with a variety of different media such as described in the above patent application. When using such a specialized mill, the carbon particle size is reduced easily down to fewer than 1 micron and thus has a high exposed surface area versus the non-milled material.

In one embodiment, as the activated carbon is milled down to 1 microns in the ozone treatment mill it is exposed to ozone gas as low as 60 g ozone/kg of carbon for 30 minutes.

This exposure to ozone allows the activated carbon residing in the fly ash as well as any unburnt carbon to react and form a non-reactive material, thus eliminating the interference associated with either form of carbon.

Note, in the subsequent milling to activate the fly ash, intergrinding the ozone treated fly ash with an additive package including calcium and polycarboxylate results in non-reactive carbon. Since the activated fly ash now contains only neutralized activated carbon it can be used to replace Portland cement in the manufacture of concrete with the resulting concrete having entrained air exceeding 4%

In summary, the ozone-treated fly ash or pozzolan can now be used in the above described fly ash activation process such that the activated fly ash can replace 60-80% by weight of Portland cement when manufacturing concrete. The result is one can achieve entrained air at greater than 4% and less than 6% utilizing the ozone-treated fly ash as a starting material.

It is noted that since ozone is heavier than air, when injecting ozone into the ozone treatment mill air is pushed out until such time as ozone is detected at the top of the mill. Thus, when the ozone is injected at the bottom of the ozone treatment mill an ozone sensor at the top of the mill indicates that the mill is full of ozone. Note, that when the ozone reacts with the carbon a slight vacuum is formed in the closed vessel used for the mill. As a result, detection of this vacuum in the vessel can be utilized to monitor the process.

It was found that ozone treatment when combined with a package of additives including quick lime (that has been interground with flyash at rates described in the referenced patent then blended with the treated fly ash) and high range water reducers as well as for instance calcium aluminate (at doseage referenced in the referenced patent) results in entrainment exceeding 5%.

Moreover, it has been found that if the pozzolan or fly ash is ground down in the subject activation process to for instance a top particle size of only 18-20 microns, with a surface area of approximately 1.5 m2/g, one obtains a material that becomes much stronger than when using Portland cement alone. It has been found that when using the ground down lime-coated pozzolan mixed with Portland cement the concrete with the activated fly ash achieves over 180% of the strength associated with using Portland cement alone, and does so in just 28 days. In 56 days the concrete approaches 200% of the strength associated with pure Portland cement. The above is achieved when the cement mixture used in the manufacture of concrete is 50-60% activated fly ash, with the remainder of the mixture being Portland 1 cement.

What this permits the user to do in one embodiment is to cut out of his cement blend over 374 pounds of cementious blended powder per yard of cementious mix and yet obtain the same or better strengths as compared to utilizing pure Portland cement.

In summary, the problem with flue gases that have been treated with activated carbon to remove mercury has been solved by an ozone treatment milling process to provide ozone-treated fly ash in which activated carbon is neutralized. When this ozone-treated fly ash is used as the starting material in a fly ash activation process, the result is concrete with at least 4% entrained air. Thus one can minimize or eliminate the problem of the activated carbon atoms contaminating the pozzolanic raw material. The result is that one can take the output of power plants and neutralize the activated carbon so that the fly ash from the power plant can be activated and used in the manufacture of concrete in which the concrete contains at least 4% entrained air.

Moreover, it has been found that if the pozzolan or fly ash is ground down in the subject activation process to for instance a top particle size of only 18-20 microns, with a surface area of approximately 1.5 m2/g, one obtains a material that becomes much stronger than when using Portland cement alone. It has been found that when using the ground down lime-coated pozzolan additive mixed with Portland cement and the polycarboxylate the concrete with the activated fly ash achieves over 180% of the strength associated with using Portland cement alone, and does so in just 28 days. In 56 days the concrete approaches 200% of the strength associated with pure Portland cement. The above is achieved when the cement mixture used in the manufacture of concrete is 50-60% activated fly ash, with the remainder of the mixture being Portland 1 cement.

What this permits the user to do in one embodiment is to cut out of his cement blend over 374 pounds of cementious blended powder per yard of cementious mix and yet obtain the same or better strengths as compared to utilizing pure Portland cement. While the cost of the above process can exceed the cost of pure Portland cement it has been found that one needs considerably less cementious blended powder per yard of mix to achieve the requisite high strength concrete, thus reducing overall cost.

In summary, fly ash contaminated with activated carbon is treated to neutralize the activated carbon by placing the contaminated fly ash in a rotary mill and introducing ozone. The result is that entrained air in concrete made from activated fly ash will contain greater than 4 percent entrained air.

BRIEF DESCRIPTION OF THE DRAWINGS

These and other features of the subject invention will be better understood in connection with the Detailed Description in conjunction with the Drawings of which.

DETAILED DESCRIPTION

Figure 1:
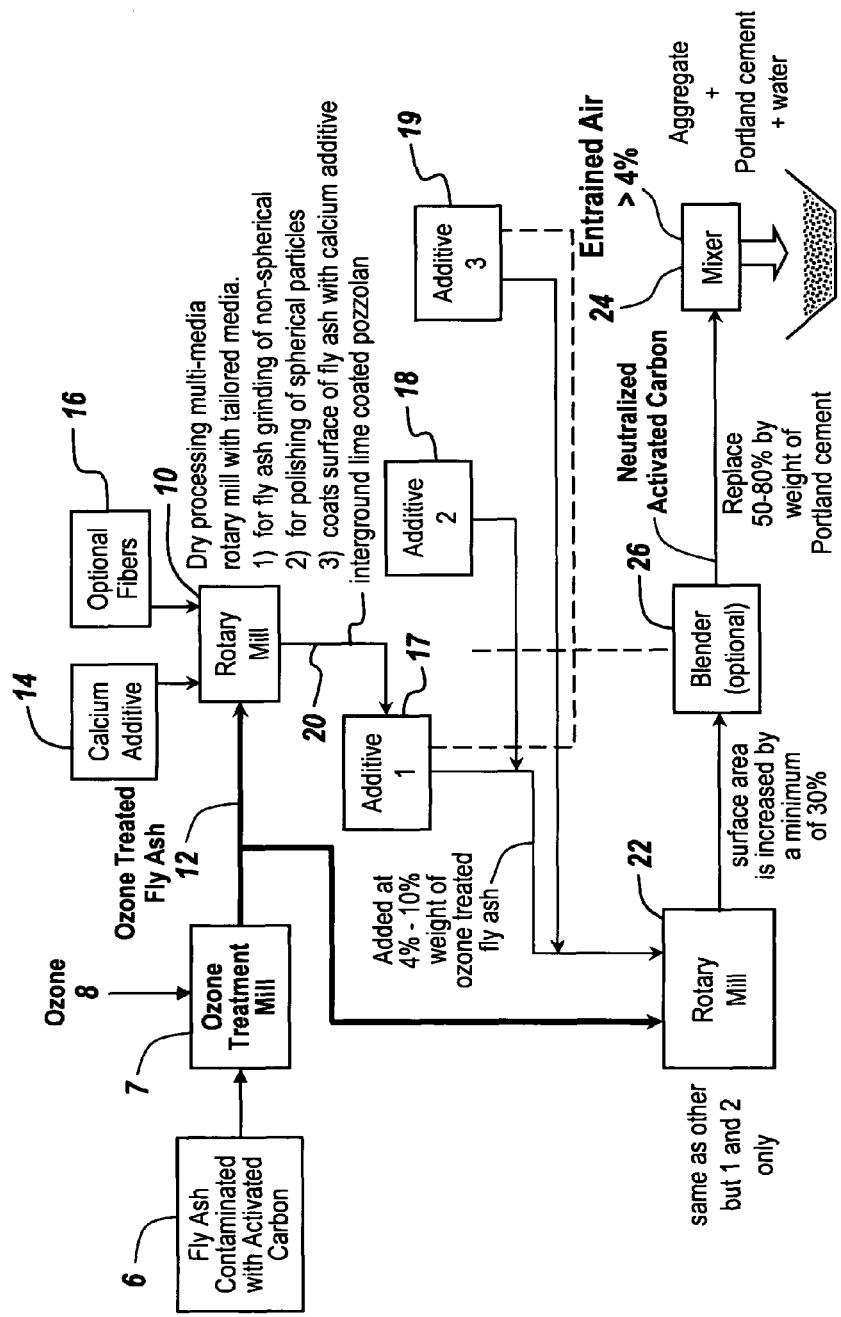
FIG. 1 is a block diagram of a process for activating fly ash so it can be used as a replacement for Portland cement in which activated-carbon contaminated fly ash is pretreated in a specialized ozone treatment mill to neutralize the effects of the activated carbon.

Referring to FIG. 1 in one embodiment fly ash contaminated with activated carbon is 6 is introduced into an ozone treatment mill 7 into which ozone 8 is introduced. The mill 7 output is then introduced into rotary mill 10 to provide it with ozone treated fly ash 12.

Figure 2:
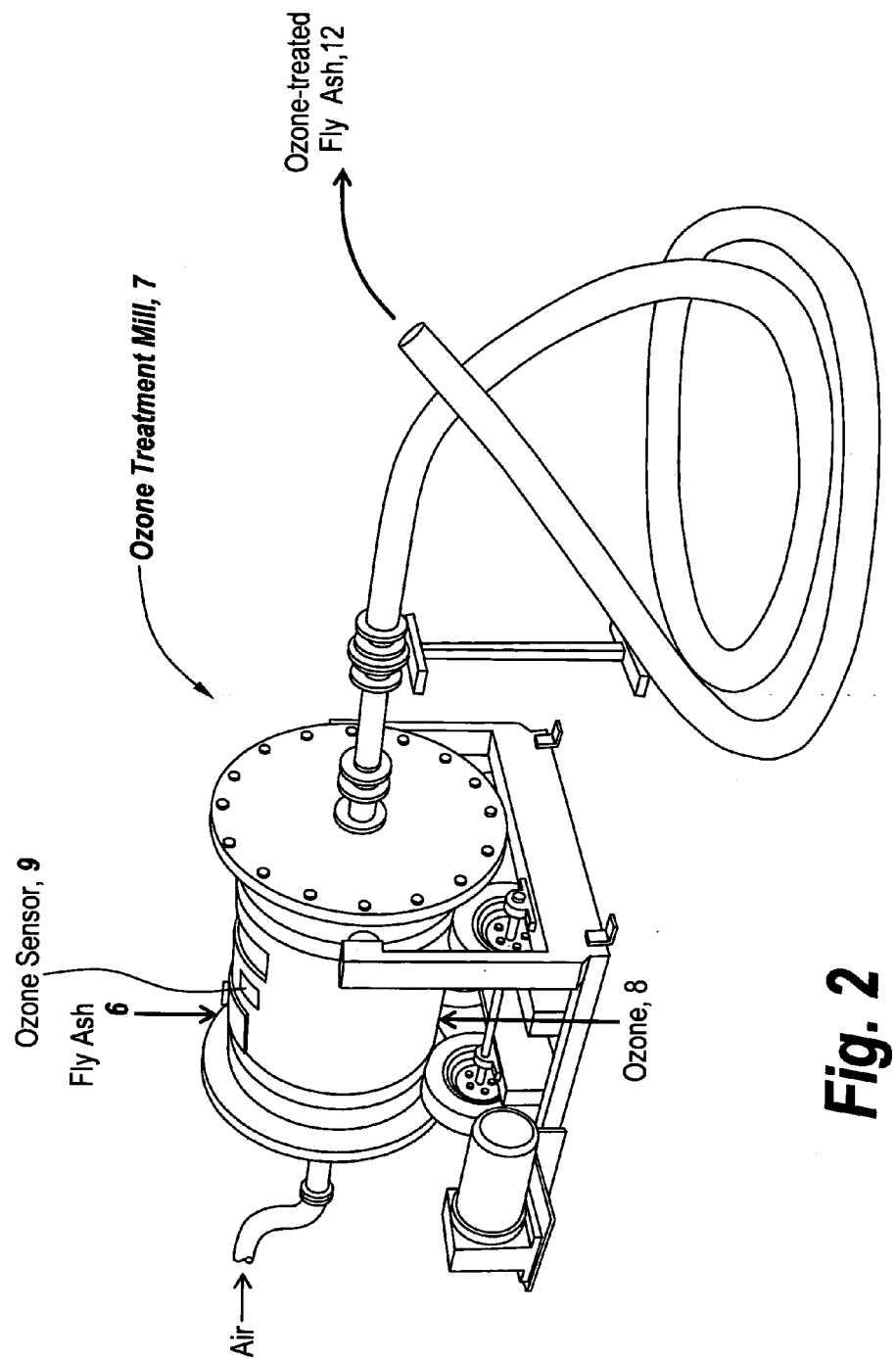
FIG. 2 is a diagrammatic representation of the ozone treatment mill of FIG. 1.

Referring to FIG. 2, ozone treatment mill 7 is shown in which ozone 8 is injected at the bottom of the mill and in which an ozone sensor 9 is utilized to sense when the mill is filled with ozone. Here it can be seen that fly ash contaminated with activated carbon is introduced to into the ozone treatment mill for the pre-treatment.

The structure of ozone treatment mill 7 is identical to mill 10 and mill 22, the characteristics of which are described in connection with FIGS. 3-5.

Referring back to FIG. 1 rotary mill 10 is a specialized mill with multi-media used to activate the fly ash. A calcium additive 14 and optionally fiber 16 is added to mill 10. The calcium additive may be either quick lime, hydrated lime, calcium carbonate, calcium formate or calcium nitrate or any calcium bearing compound.

Rotary mill 10 provides dry processing multimedia, with both rotary mills 7 and 10 having a tailored media composition specific for grinding non-spherical fly ash particles, for polishing spherical particles and further to coat the surface of the fly ash with the calcium additive. The result for mill 10 is an interground lime coated pozzolan which is available as an additive 17 on feedline 20 that consists of an additive in which fly ash is interground with calcium. In one embodiment the additive 17 consists of 85% fly ash and 15% calcium product.

Note, that additive 17 contains activated carbon that has been neutralized by the ozone treatment which makes possible greater than 4% air entrainment in concrete made by the activated fly ash from the mill.

This activated carbon neutrilizedlime-coated fly ash additive is added at 4-10% by weight of fly ash to an additional rotary mill 22 to which is supplied activated carbon neutralized fly ash from ozone treatment mill 7. It will be appreciated after milling by rotary mill 22 the total surface area is increased by a minimum of 30% such that when the output of rotary mill 22 is supplied to a mixer 24 and is mixed with aggregate, Portland cement and water, a concrete is formed having at least a slag 100 performance. Importantly the output of mill 22 contains activated fly ash with activated carbon contaminants completely neutralized. This permits manufacture of concrete with entrained air of at least 4%.

Note, in one embodiment a second additive 18 comprising a polycarboxylate high range water reducer, in powder form at 0.1%-0.2% by weight of fly ash further increases the reactivity of the fly ash. This second additive is added to rotary mill 22 which when interground with fly ash 12 provides an even better reactivity for the activated fly ash to be mixed at 24.

Importantly, it has been found that the polycarboxylate in cooperation with the ozone completes the neutralization of the activated carbon since this activated carbon residency in the fly ash and any unburnt carbon reacts to form a non-reactive material, thus eliminates the interference of any form of carbon with air entrainment.

It will be noted that rather than adding Additive 2 to Additive 1 in rotary mill 22, the output of rotary mill 22 with Additive 1 can be supplied to a blender 26 which blends the fly ash that has been interground with Additive 1 and blends it with Additive 2.

Moreover, it is possible to provide even further reactivity for the fly ash by providing a further additive 19, namely Additive 3, to rotary mill 22, with Additive 3 comprising calcium aluminate cement with a lithium compound premixed in one embodiment to approximately 2% by weight of fly ash.

Again, rather than adding Additive 3 to rotary mill 22, one can likewise take the output of rotary mill 22 which intergrinds Additive 1 and Additive 2 with fly ash and blend it with Additive 3 at blender 26.

As illustrated, the output of rotary mill 22 whether through blender 26 or not replaces 50-80% by weight of Portland cement in mixer 24 to provide as much as a slag grade 120 performance while at the same time not impacting air entrainment in the concrete such that the concrete achieves at least 4% entrained air.

It will also be appreciated that while two identical rotary mills are shown at 10 and 22, rotary mill 10 may be used again to intergrind Additive 1 which it has previously generated with fly ash and further additives such as Additive 2 and Additive 3, rather than having to provide two separate rotary mills.

The net result of the combinations described above is a minimum increase in fly ash surface area of 30% to a maximum increase in surface area of about 70%, with the surface area increase providing for the ability to utilize even activated carbon contaminated fly ash as a replacement for expensive Portland cement in the manufacture of concrete.

With respect to the specialized mill itself, rather than utilizing various types of mills such as a ball mill, a hammer mill, a vibrating mill, a roller mill or numerous other types of mills, the subject rotary mill works off a simple drum design that rotates at a predetermined speed and has inside it a tailored mix of media as previously described so that one can load the specialized rotary mill, process the pozzolan and exit the processed pozzolan without ever having to stop the rotation of the mill, just slowing it to an optimized rotation for emptying.

In one embodiment, the product is introduced into a port, at which point the mill is started up and is rotated between for instance 20 and 40 RPM. In one embodiment, the cylinder is has a 6 foot diameter and a length of 10 feet; and has a hose fitting at each end on a swivel bearing that allows the drum to rotate while at the same time permitting introduction of air on one side and product evacuation from the other side while the mill is still rotating. Air is introduced to force the mill products out the exit port through a specially slotted discharge plate. Once the desired milling has been achieved it takes about 10 to 15 minutes to evacuate the mill, depending on the initial charge of the mill at which point it is reloaded.

As to the media content of the mill, the mix of the media is important in terms of the gradations and the specific processing that is to be done by the mill. In one embodiment, the mix of the media is one-half inch cylinders and one-eighth cylinders to which may be added five-eighth cylinders in various combinations. It is noted that if two media are used, for instance a five-eighth cylinder and a one-half inch cylinder, then one might have to rotate the mill an hour in order to get the desired grind. However, if a one-eighth cylindrical media is also introduced, then the grinding time can be reduced to 15 minutes. Note, in one embodiment the mill is filled up with up to one-half of its volume with media, whereas the product to be milled completes the filling to approximately two-thirds of the volume of the mill.

It has been found that by using charges of different sizes of media, presently ceramic cylinders, i.e. 1 inch at 400 pounds, ½ inch at 400 pounds vs. ¼ at 800 pounds or other combinations of sizes that one can obtain better efficiency for the processing of the fly ash.

Additionally, it has also been found that one can actually reduce the overall particle size of the total material from for instance 200 microns top size and 25 microns avg to 75 microns top size and to a mean diameter of 12 microns. Moreover, the reduction in size of aspherical particles or irregularly shaped slag or sand or molten particles formed in the burner of a coal fired power plant is dramatic. Further, as mentioned above, spherical shaped amorphous glass bead particles are not reduced in size but are impacted on the surface, to increase surface area. Moreover, all of the non-spherical particles and a small amount of the spherical particles, being cenospheres, or low strength spheres for instance 3,000-5,000 PSI crush strength, are reduced nominally to under 25 microns from for instance a starting size of 200 microns. The milling still allows the material that has been processed to obtain good flowability when tested in mortar mixes with a small amount of water reducer used in concrete and tested in the same manner.

In short, in one embodiment the increase in surface area in the pozzolan of 73% from 0.695 to 01.263 m2/g increases the reactivity of the fly ash when further treated with the above additives by allowing material that is in its natural state when formed in a furnace to become cementious when ground down and exposed to calcium and other admixtures such as specific carboxylates. The increase in surface area acts to accelerate most cementious reactions of the fly ash and greatly increases the activity of the overall fly ash versus a non-ground down fly ash, non-surface ground spheres and non-carboxyalte treated pozzolan.

Moreover, it has been discovered that a specific carboxylate can activate the right kind of fly ash, namely Class F fly ash, that has been produced from a blend of mixing powder river basin coal with lignite or bituminous coal before milling and firing in the furnace to give cementious properties without the need to add a Portland cement to obtain strength.

Note also that the specific media charge used, being ceramic in nature, determines the treatment time it takes as well as the rotational speed of the mill and charge of media versus the charge of fly ash to treat.

It will be appreciated that while the above describes the milling of fly ash pozzolan, there are other pozzolans that benefit from the subject milling technique. For instance, natural pozzolan when run through the subject milling process using the same additives has provided the same type of increase in performance in mortars/concrete.

In another embodiment, fly ash pozzolan that is produced by the Limestone power plant is used at 85% by weight of pozzolan to which is added 15% by weight of quick lime. Putting these two ingredients in the mill and rotating it for instance for 40 minutes actually pounds the lime into the surface of the pozzolan while at the same time activating the pozzolan. In addition to quicklime, one can use high dredging lime, although the quicklime appears to provide better results. It has been found that the pozzolan/quicklime mixture can be used by itself to achieve at least 100 grade concrete.

In another embodiment, having activated the pozzolan and intergrinding it with quicklime and then adding it at 4% or higher to the treated pozzolan from a separate rotary mill, one is able to replace as much as 60% of Portland cement with this mixture. The net result is that one achieves an activated pozzolan mixture that reacts on a level equal to or greater than that of ground blast furnace slag that produces slag grade 100 concrete.

In yet another embodiment, one takes a large roll mill, grinds down pozzolan to a surface area of at least 0.95 m2/g and then adds the output of the subject mill at 4 wt. % to obtain grade 100 slag. Then by grinding further to a total surface area of 1.2 m2/g or higher using the Lime additive and a high range water reducer one can reach grade 120 slag.

A further example for the production of slag grade 120 concrete takes a pozzolan with a starting surface area of 1.158 m2/g and processes it in the subject mill to arrive at a 1.986 m2/g surface area to achieve a grade 120 slag when tested using the ASTM 989 standard.

Further, other additives and further milling in addition to other additives may be used to increase the rating to slag grade 120 concrete. These include the use of a very small amount of calcium aluminate cement or, i.e. 2% by weight of pozzolan, that has been ground down with a lithium compound and then added to the pozzolanic cement. Note that in one embodiment the lithium compound is ground at 0.1% or less of the calcium aluminate to accelerate the calcium aluminate and also to add protection to any concrete structure against alkaline silica reactivity, as lithium is known to remediate alkaline silica reactivity or ASR.

Figure 3:
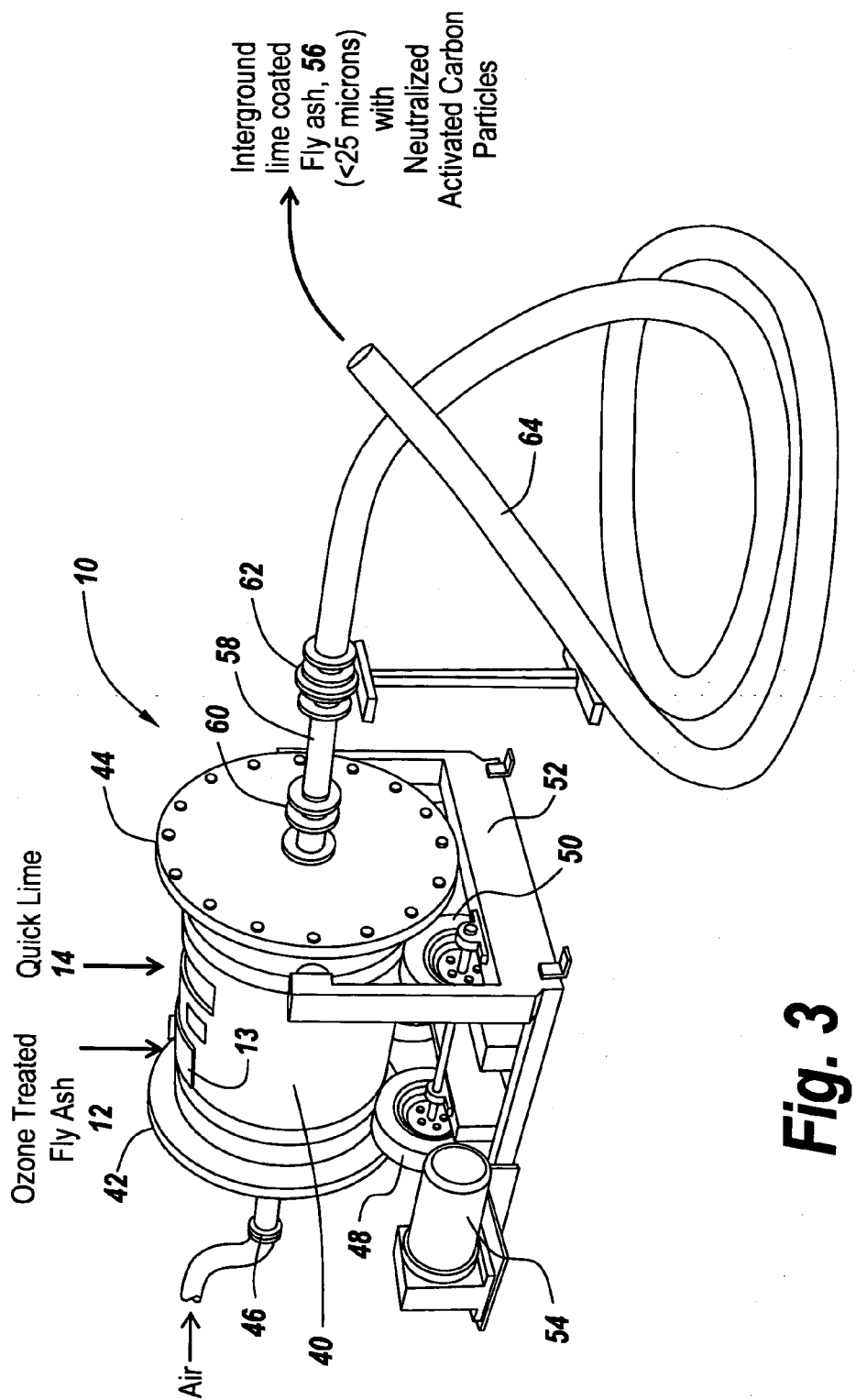
FIG. 3 is a diagrammatic illustration of the rotary mills of FIGS. 1 and 2 illustrating the introduction of ground neutralized activated carbon contaminated fly ash and quick lime to provide a neutralized activated fly ash usable to manufacture concrete having entrained air exceeding 4%.

Referring now to FIG. 3, the specialized rotary mill 10 is filled with a multi-media charge. Mill 10 is shown to have a central drum 40 provided with end plates 42 and 44 that contain the pre-ground fly ash introduced into an inlet pipe 46.

Drum 40 is mounted on drive wheels 48 and 50 supported on a frame 52, with wheel 48 driven by motor 54 to rotate the drum to typically at a speed of 20-40 RPM.

As will be discussed, the differing media in the mill acts to grind the aspheric ground fly ash, while at the same time roughing up the spherical particles without crushing them so as to eject activated fly ash 56 through an outlet pipe 58 having rotary couplings 60 and 62.

Activated carbon contaminated fly ash 12 is introduced into hatch 13, with the mill operated in a batch process fashion to intergrind the ground fly ash introduced at 13 with quick lime 14, in one embodiment. The mill is provided with an injection of ozone 16 until it is filled as indicated by an output from an ozone sensor 17. The typical batch processing time for processing the contaminated pre-ground fly ash is at least 30 minutes and typically between 45 and 60 minutes, after which the drum 40 is evacuated utilizing gas pressure at pipe 46 to force the activated carbon neutralized activated fly ash out through pipe 58 and line 64. The activated fly ash, while in general having a mean diameter of less than 25 microns, more specifically has a much increased surface area such as described in connection with FIG. 1.

Figure 4:
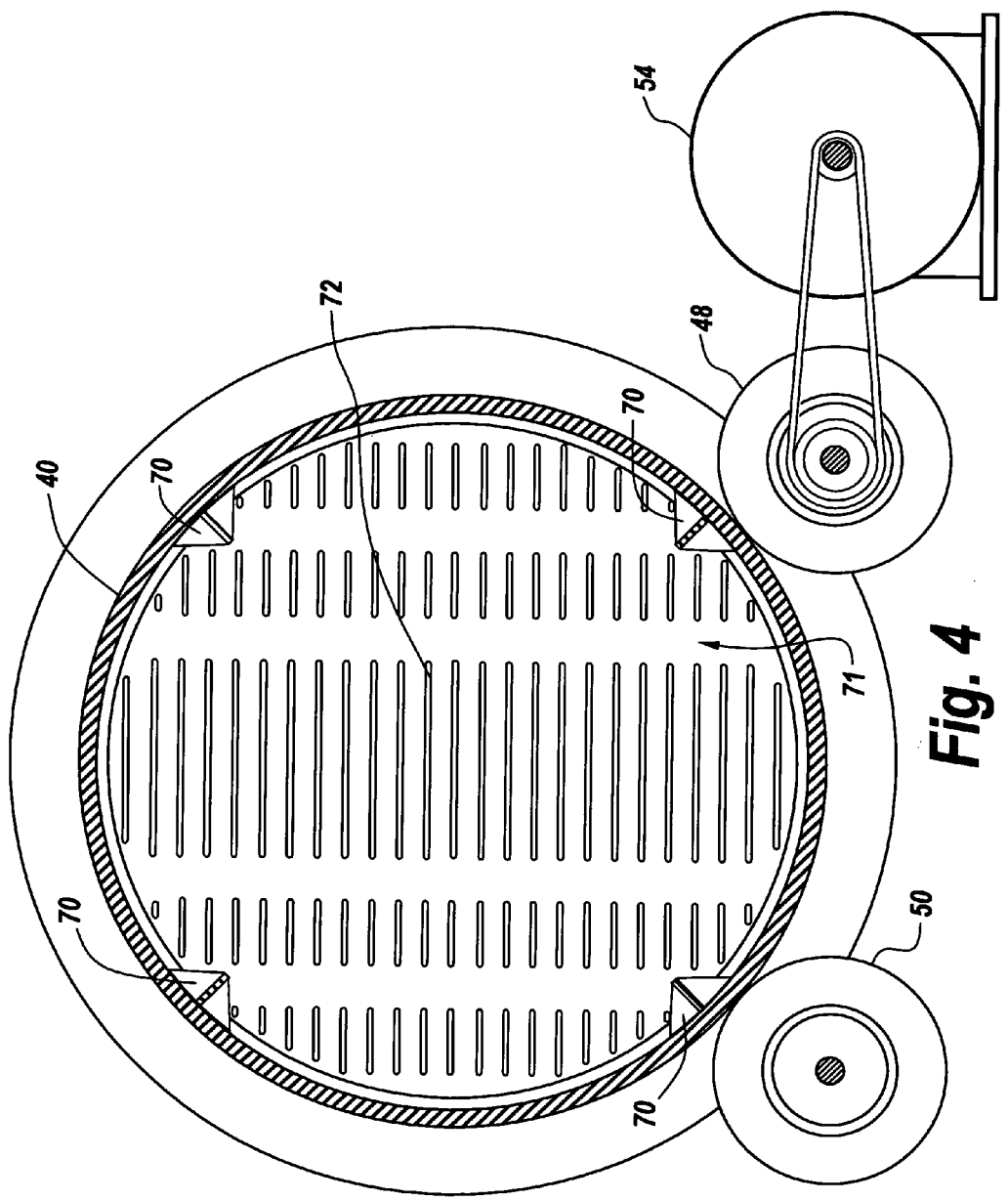
FIG. 4 is a diagrammatic illustration of one end of the rotary mill of FIG. 3 illustrating inwardly projecting mixer ribs, which can also include stubs on patterned intervals to help the mill further rough up and grind specific particles and obtain the surface area increase in a shorter amount of time, also showing a slotted exit port for the activated fly ash and, FIG. 5 is a cross sectional view of the rotary mill of FIG. 3, illustrating the multi media charge at the bottom of the mill, the flow of the material through the mill and the exit of neutralized activated fly ash from the mill.
Figure 5:
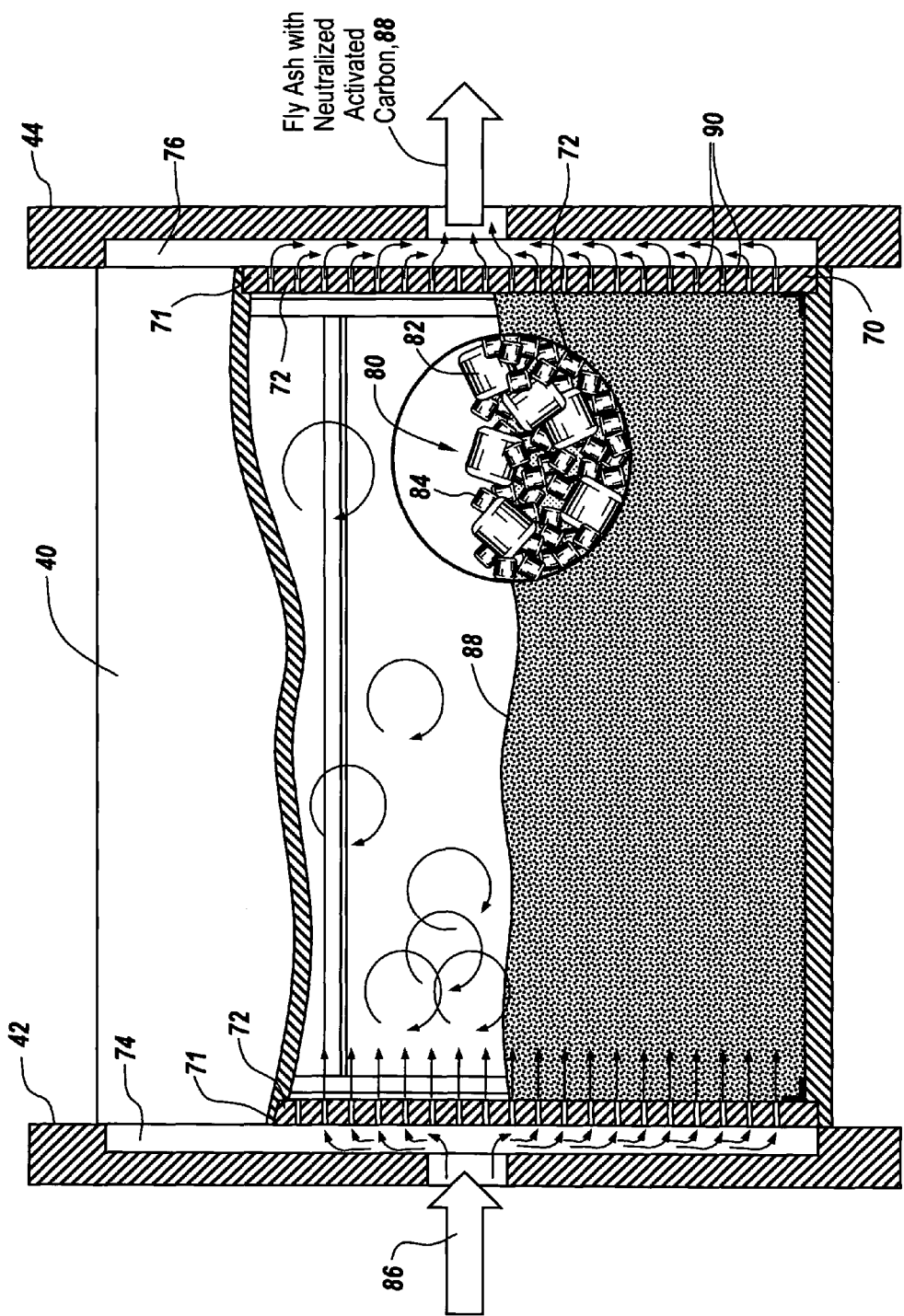

Referring to FIG. 4, drive wheel 48 drives drum 40, with wheel 50 acting as an idler wheel. Interior to drum 40 are a number of ribs 70 that project inwardly into the interior drum 40. Also pictured is a slotted end exit plate 71 having slits 72 through which activated fly ash passes, with the slots providing a filter for the activated fly ash.

Referring to FIG. 4, drum 40 is shown with slotted plates 71 that communicate with an input plenum 74 and an output plenum 76 through end plates 42 and 44.

Drum 40 is preloaded with a tailored charge of ceramic media, here shown at 80 to include different size ceramic media 82 and 84. The formulation of which determines the amount of grinding of the fly ash introduced into drum 40 as illustrated at 86 and which occupies at least one-third of the volume of drum 40 as illustrated at 88.

In one embodiment, when the pre-ground fly ash has been ground by the subject small rotary mill for 45 minutes, the activated fly ash 88 with activated carbon contaminates neutralized is ejected through slits 42 in exit plate 71.

As to the constituency of the multi media, this formulation can be tailored as indicated above. For instance the formula for the media may include one-half inch cylindrical ceramic media, one-fourth inch cylindrical ceramic media, three quarter inch cone shaped ceramic media and eight millimeter beads. Also as described above, in another formulation one can use a mixture of ⅝ inch cylinders with ¾ inch cones and ⅛ inch cylinders, it being understood that there are many different media combinations may be used in combination with different types of fly ash and different residence times.

For instance, depending on the media formulation one can lower the residence time from for instance one hour to less than 45 minutes, with the media matched to the pozzolan or the fly ash being treated.

Thus the subject mill can treat multiple components differently depending on the mix of media in the mill and the configuration thereof. Specifically with respect to the treatment of pre-ground fly ash to provide activated fly ash the differently configured media acts differently on the aspheric crushed fly ash as opposed to the spherical beads. In the case of aspherical fly ash particles, they are further ground down without cracking or grinding any spherical fly ash particles. On the other hand, the spherical glass beads are polished to roughen up this surface. In both cases the surface area of the fly ash particles is increased. Thus, for the aspherical particles the increased surface area is performed by grinding, whereas for the glass beads, the increased surface area is provided by roughing up the surface of the beads.

The net result is that through the use of the specialized small rotary mill one can dramatically increase the surface area of pre-ground fly ash to activate it sufficiently to provide slag grade 100-120 performance when it is used to replace some of the Portland cement used to form concrete while at the same time neutralizing any activated carbon contaminants.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for treating fly ash contaminated with activated carbon so as not to negatively limit the amount of entrained air in concrete made from the contaminated fly ash, comprising the steps of:
grinding fly ash contaminated with activated carbon in an atmosphere of ozone in an activation process that includes a specialized rotary mill having media that is tailored so as to preferentially grind aspherical fly ash particles so as to increase the surface area thereof by breaking the aspherical particles apart, and so as to preferentially rough up the surface of the spherical particles to increase the reactivity thereof by increasing surface area;
intergrinding the fly ash with a calcium additive in the activation process to calcium coat the ozone-treated fly ash.

2. The method of claim 1, wherein the ozone-treated fly ash is activated to increase the surface area thereof.

3. The method of claim 1, wherein the activated fly ash is intergound with a high range water reducer.

4. A method for treating fly ash contaminated with activated carbon so as not to negatively limit the amount of entrained air in concrete made from the contaminated fly ash, comprising the steps of:
grinding fly ash contaminated with activated carbon in an atmosphere of ozone in a specialized rotary mill; wherein the contaminated fly ash is ground in the rotary mill that includes media that is tailored so as to preferentially grind aspherical fly ash particles so as to increase the surface area thereof by breaking the aspherical particles apart, and so as to preferentially rough up the surface of the spherical particles to increase the reactivity thereof by increasing surface area.

5. A method for treating fly ash contaminated with activated carbon so as not to negatively limit the amount of entrained air in concrete made from the contaminated fly ash, comprising the steps of:
grinding fly ash contaminated with activated carbon in an atmosphere of ozone in a specialized rotary mill that includes media that is tailored so as to preferentially grind aspherical fly ash particles so as to increase the surface area thereof by breaking the aspherical particles apart, and so as to preferentially rough up the surface of the spherical particles to increase the reactivity thereof by increasing surface area;
intergrinding the ozone-treated fly ash and the calcium additive in a specialized rotary mill having tailored media of different size and shape so as to produce calcium-coated fly ash.

6. The method of claim 5, and further including the step of intergrinding the calcium-coated fly ash with ozone-treated fly ash in a specialized rotary mill having tailored media.

7. The method of claim 6, and further including the step of adding a high range water reducer when intergrinding the calcium coated fly ash with the ozone treated fly ash.

* * * * *